(12) United States Patent
Schneider (10) Patent No.: US 6,267,351 B1
(45) Date of Patent: Jul. 31, 2001

(54) ELECTROMAGNETIC VALVE ACTUATOR WITH MECHANICAL END POSITION CLAMP OR LATCH

(75) Inventor: Leo E. Schneider, Cypress, CA (US)

(73) Assignee: Aura Systems, Inc., El Segundo, CA (US)

( * ) Notice: Subject to any disclaimer, the term of this patent is extended or adjusted under 35 U.S.C. 154(b) by 0 days.

(21) Appl. No.: 09/181,023

(22) Filed: Oct. 27, 1998

(51) Int. Cl.[7] .................................................. F16K 31/02
(52) U.S. Cl. ......................... 251/70; 251/129.1; 251/297
(58) Field of Search ................... 251/70, 129.1, 251/297; 123/90.11, 90.12

(56) References Cited

U.S. PATENT DOCUMENTS

| 775,054 | * | 11/1904 | Waterman | 251/70 |
|---|---|---|---|---|
| 959,609 | * | 5/1910 | Roehrich | 251/70 |
| 1,281,185 | * | 10/1918 | Martin | 251/70 |
| 1,434,637 | * | 11/1922 | Tuck | 251/89 |
| 1,501,303 | * | 7/1924 | Berry | 251/70 |
| 1,568,817 | * | 1/1926 | Falkenwalde | 251/70 X |
| 1,783,515 | * | 12/1930 | Montgomery | 251/129.1 X |
| 1,787,212 | * | 12/1930 | Rickenberg | 251/70 |
| 2,224,147 | * | 12/1940 | Ehlers | 251/70 |
| 2,723,681 | * | 11/1955 | MacGlashen, Jr. et al. | 251/70 X |
| 3,385,559 | * | 5/1968 | Churchill | 251/70 |
| 3,463,443 | * | 8/1969 | Churchill | 251/70 |
| 4,165,762 | * | 8/1979 | Acar | 251/77 |
| 4,342,335 | * | 8/1982 | Reinicker et al. | 251/297 X |
| 4,494,727 | * | 1/1985 | Babitzka et al. | 251/70 X |
| 4,957,018 | * | 9/1990 | Jakubiec et al. | 251/297 X |
| 5,189,991 | * | 3/1993 | Humburg | 251/129.1 X |
| 5,638,866 | * | 6/1997 | Mueller | 251/65 X |
| 5,772,179 | * | 6/1998 | Morinigo et al. | 251/129.1 |
| 5,775,278 | * | 7/1998 | Moriya et al. | 251/129.1 X |
| 5,782,454 | * | 7/1998 | Bulgatz et al. | 251/129.1 |

FOREIGN PATENT DOCUMENTS

| 17958 | * | 8/1896 | (GB) | 251/70 |
|---|---|---|---|---|
| 8315 | * | 4/1909 | (GB) | 251/70 |

* cited by examiner

Primary Examiner—Kenneth Bomberg
Assistant Examiner—John Bastianelli
(74) Attorney, Agent, or Firm—Blakely Sokoloff Taylor & Zafman LLP (57) ABSTRACT

An electromagnetic actuator composed of: an armature movable along a linear path between first and second end positions; electromagnets positioned and operative for selectively moving the armature to either one of the first and second end positions; and a mechanical holding element operative in response to movement of the armature to either one of the end positions for holding the armature in the end position to which the armature has moved until an appropriate one of the electromagnets is operated to move the armature to the other one of the end positions.

11 Claims, 10 Drawing Sheets

ELECTROMAGNETIC VALVE ACTUATOR WITH MECHANICAL END POSITION CLAMP OR LATCH

BACKGROUND OF THE INVENTION

The present invention relates to electromagnetic valve actuators in which the displacement of valves is controlled by energizing actuator electromagnets with currents having suitable waveforms, or pulse patterns.

Actuators of the type here under consideration may be used, for example, in place of conventional mechanical valve lifters for actuating automotive engine cylinder intake and exhaust valves. However, such valves may be employed in other types of power systems or fluid flow systems.

Known electromagnetic valve actuators include an armature shaft which contacts a valve stem to a valve head, bias springs which act on the armature shaft to urge it towards an intermediate position and electromagnets that are individually energizable to move the armature shaft, and thus the valve head, to either one of two end positions. These two end positions correspond, respectively, to a closed position in which the valve head mates with a valve seat and an opened position in which the valve head is spaced from the valve seat.

An example of such an electromagnetic valve actuator is disclosed in commonly owned U.S. Pat. No. 5,782,454, the entire disclosure of which is incorporated herein by reference.

In the operation of such a valve actuator, the valve head will remain in one of its end positions as long as one of the electromagnets is producing a magnetic field sufficient to hold the armature in that position against the force of the bias springs. Therefore, a significant current must be supplied to the energized electromagnet for as long as the valve head is to be maintained in the opened or closed position. As a result, a considerable amount of electrical power would be consumed in the operation of one of these valve actuators. In systems employing a plurality of valves, which may be up to 48 valves in some automotive engines, the current consumption level is proportionally higher.

As a general rule, it is preferable that movement of a valve between its opened and closed position occur in the shortest time possible. The speed of movement for a given assembly depends on the level of current supplied to the electromagnetic being energized, which in turn determines the acceleration experienced by the valve and actuator components which move as a unit with the valve.

However, the higher the valve displacement speed, the greater the impact associated with arrival of the valve at its end position and the greater the likelihood that the valve will experience some bounce at the end of its movement. These factors adversely affect the performance of the associated engine.

BRIEF SUMMARY OF THE INVENTION

It is a primary object of the present invention to reduce the electrical energy required by such a valve actuator.

A more specific object of the invention is to eliminate the need for supplying a holding current, or to reduce the level of such holding current, during periods when the valve head is to remain in either one of its end positions.

Another specific object of the invention is to provide a mechanism which mechanically clamps the armature in either one of its end positions until a new armature movement is required.

A further object of the invention is to produce a controlled braking force that reduces the landing velocity of the actuator armature shaft at the valve head end positions, to thereby reduce bounce, noise and component wear.

The above and other objects of the invention are achieved by an electromagnetic actuator comprising an armature that includes an armature shaft movable along a linear path between first and second end positions; electromagnet means positioned and operative for selectively moving the armature to either one of the first and second end positions; and mechanical holding means operative in response to movement of the armature to either one of the end positions for contacting and holding the armature in the end position to which the armature has moved until the electromagnet means are operated to move the armature to the other one of the end positions. The holding means according to the invention may be in the form of either a clamping device which produces a frictional holding force, or a latching device which can engage a formation on the armature shaft in an interlocking manner.

BRIEF DESCRIPTION OF THE SEVERAL VIEWS OF THE DRAWING

FIG. 21A is an exploded detail view showing components of the device of FIG. 20.

DETAILED DESCRIPTION OF THE INVENTION

Figure 1:
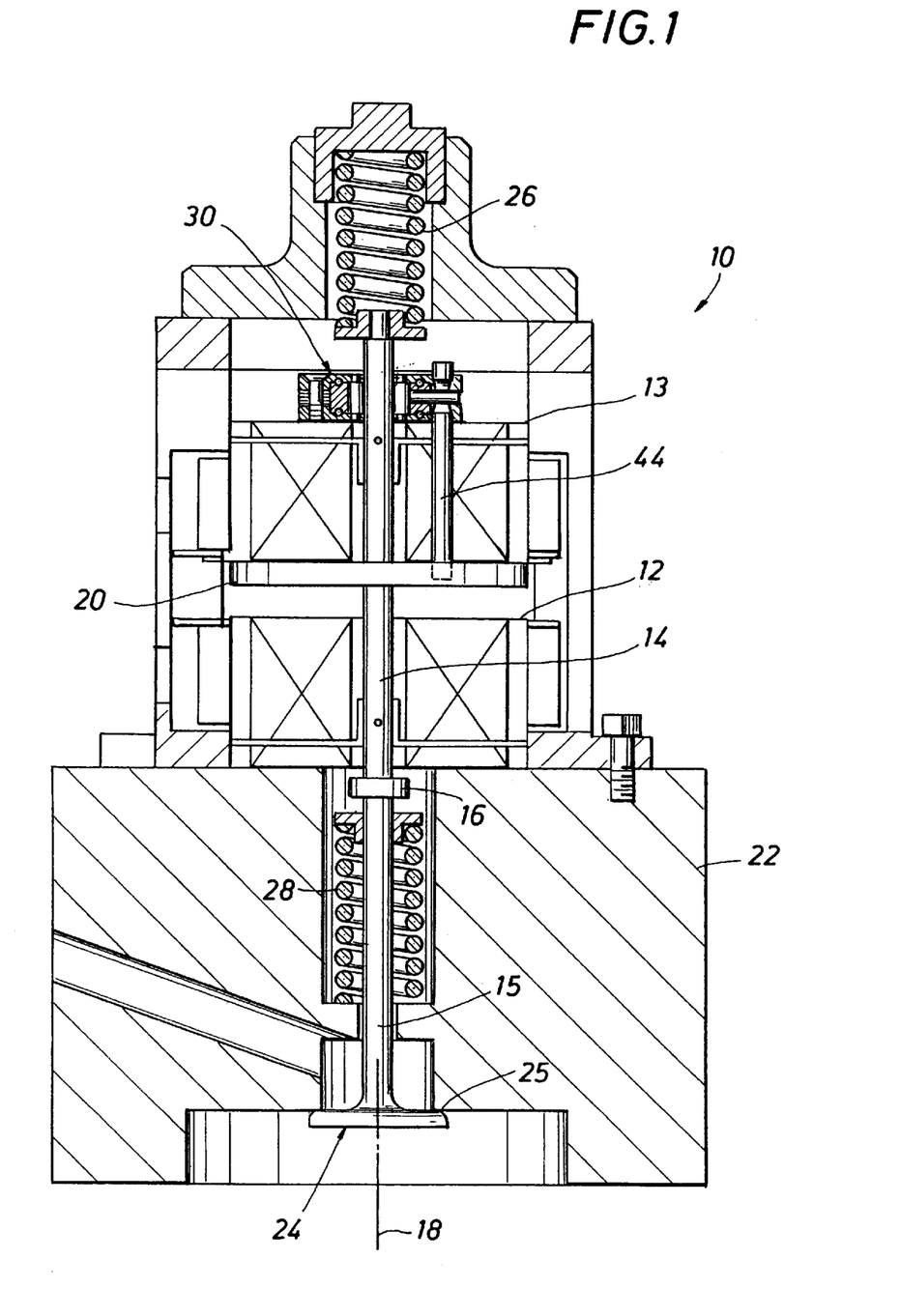
FIG. 1 is an elevational, cross-sectional view of a first embodiment of an electromagnetic valve actuator equipped with a clamping device according to the present invention.

FIG. 1 shows an electromagnetic valve actuator 10 equipped with a clamping mechanism according to one embodiment of the invention. Electromagnetic valve actuator 10 includes a lower electromagnet 12 and an upper electromagnet 13, each including a coil. An armature shaft 14 extends through passages in electromagnets 12 and is fixed to, or integral with, an armature 20 made of a magnetizable material. Armature 20 is in the form of a disc located between electromagnets 12 and 13. Armature shaft 14 is coupled to a valve stem 15 via a mechanical or hydraulic coupling 16. Coupling 16 serves to compensate for thermal growth experienced by valve stem 15. Examples of such couplings are disclosed in pending U.S. application Ser. No. 09/146,738, filed on Sep. 3, 1998, the disclosure of which application is incorporated herein by reference. Such couplings are presently employed in motorcycle and racing car engines and would be used in actuators according to the invention installed in automotive vehicle and aircraft engines, although they may not be required in actuators associated with air valves, etc.

Valve stem 15 extends through a passage, or valve guide, in a cylinder head 22 and the lower end of valve stem 15 carries a valve head 24 associated with a valve seat 25. Armature shaft 14 and valve stem 15 extend along a central axis 18 which also defines a linear path along which armature shaft 14 and valve stem 15 move as a unit between closed and open positions of valve head 24.

Actuator 10 also includes two biasing springs 26 and 28 which bias armature shaft 14, valve stem 15 and armature 20 in a neutral position, at least approximately between the closed and open positions of valve head 24. Further details of the actuator structure will be found in U.S. Pat. No. 5,782,454, cited above.

When lower electromagnet 12 is energized, armature 20 is pulled downwardly along central axis 18 to move valve head 24 to its open position. On the other hand, when the upper electromagnet 13 is energized, armature 20 is moved upwardly along central axis 18 to move valve head 24 to its closed position. Operation of valve 10, as described thus far, is described in detail in U.S. Pat. Nos. 5,222,714 and 5,355,108, the disclosures of which are incorporated herein by reference.

The structural elements described thus far correspond to elements shown in FIG. 1 of U.S. Pat. No. 5,782,454. In order to maintain valve head 24 in either one of its end positions in this prior art device, the energized electromagnet must be continuously supplied with a level of current sufficient to reliably overcome the biasing force of springs 26 and 28.

According to the present invention, the valve actuator 10 described thus far is supplemented by a mechanical clamping assembly 30 that acts to hold armature shaft 14, valve stem 15, armature 20 and valve head 24 in either end position by a mechanical clamping action that will be maintained passively until an energizing current is supplied to an electromagnet to release the remaining force imposed on the armature and to urge armature 20 and valve head 24 toward their other end position.

One preferred embodiment of such a clamping assembly is shown in greater detail in FIGS. 2–7 which are, respectively, a partial cross-sectional view of the clamping assembly in its assembled state, a partial cross-sectional exploded view showing the components of the clamping assembly separated from one another, three axial end views of components of the clamping assembly and a detail view of another one of the components of the clamping assembly.

The clamping assembly embodiment shown in FIGS. 2–7 is composed of two end plates 34 and 36, a rotary bearing 38, roller pins 40, return spring units 42 (not shown in FIG. 2) for biasing the roller pins 40 in radially outward directions and an input member, or linear camshaft, 44. Armature shaft 14 extends through end plates 34 and 36 and rotary bearing 38. Member 44 is guided in bores in end plates 34 and 36 and is fixed to armature 20. Therefore, member 44 will move in unison with armature shaft 14, valve stem 15, armature 20 and valve head 24 parallel to central axis 18.

Figure 2:
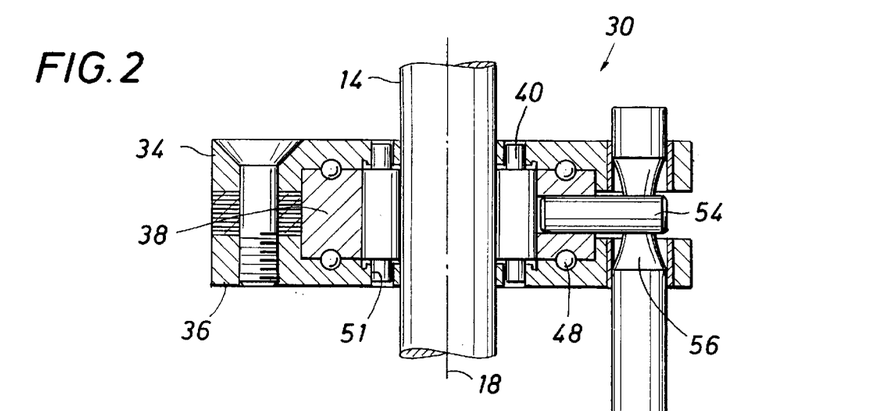
FIG. 2 is a cross-sectional detail view of one embodiment of a clamping device according to the invention.
Figure 3:
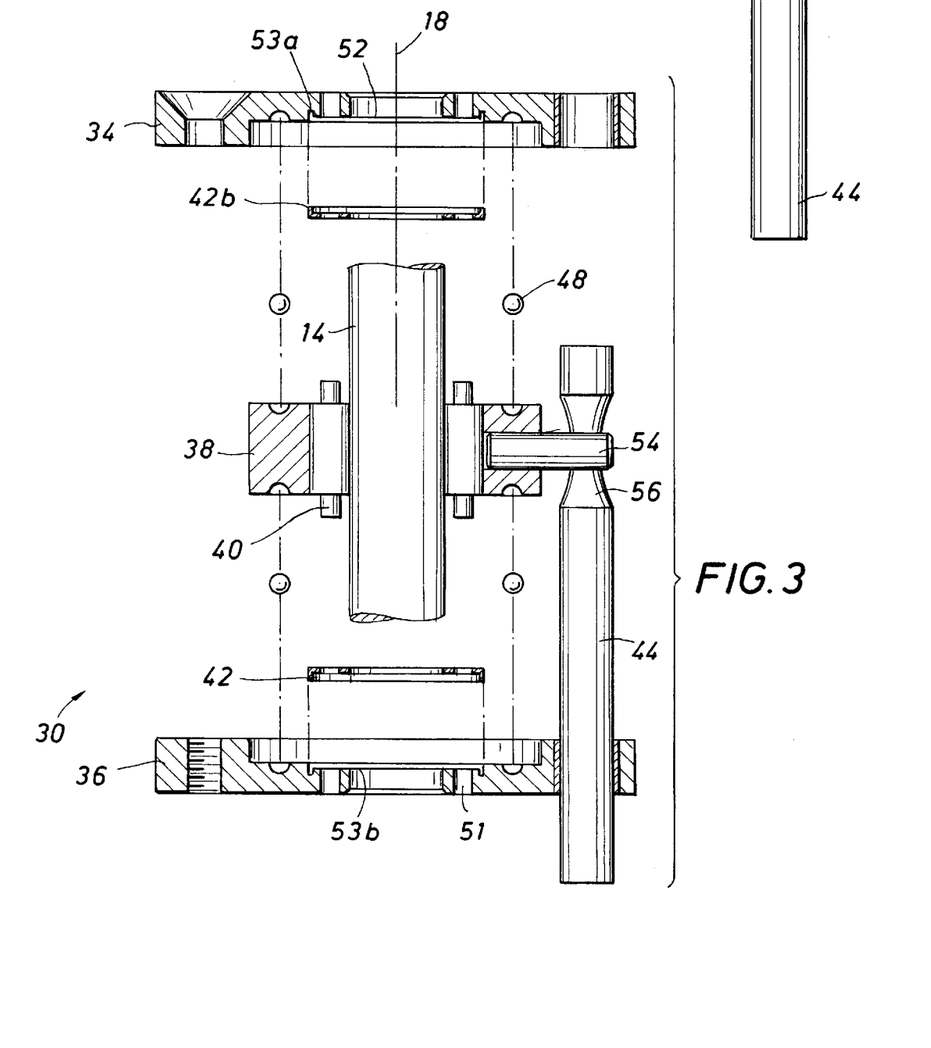
FIG. 3 is an exploded, cross-sectional view of the clamping device of FIG. 2.
Figure 4:
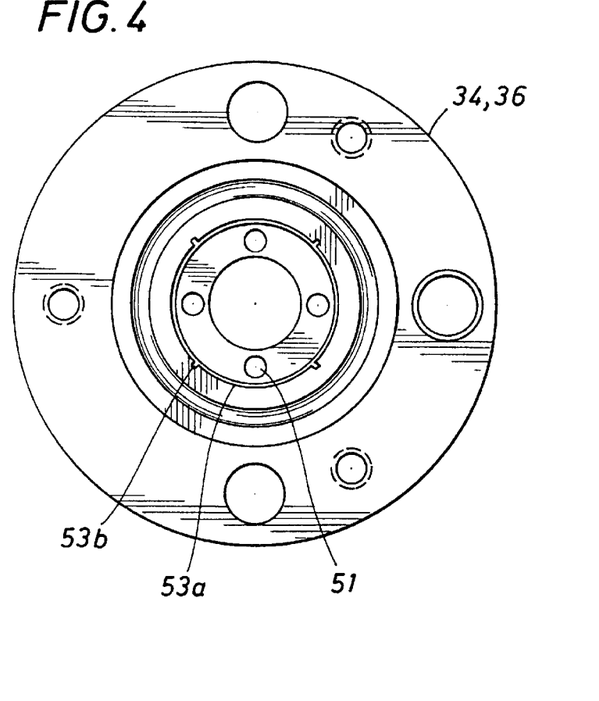
FIGS. 4, 5 and 6 are axial end views of three components of the clamping device of FIGS. 2 and 3.
Figure 5:
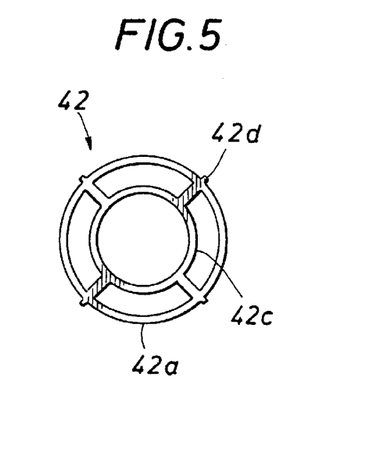

Rotary bearing 38 is held between end plates 34 and 36 via two sets of ball bearings 48 that allow rotary bearing 38 to pivot relative to end plates 34 and 36 with the minimum achievable drag and wear. End plates 34 and 36 are fixed in position in actuator 10, as by suitable bolts secured in upper electromagnet 13, so that end plates 34 and 36 are prevented from rotating about central axis 18. The inner circumference of rotary bearing 38 is provided with a plurality of camming surfaces 50, one for each pin 40.

Pins 40 extend through a central bore in rotary bearing 38 and the ends of pins 40 have reduced cross sections and are supported in recesses 51 formed in end plates 34, 36. Each recess 51 has basically a circular cross section and is dimensioned to hold its associated pin 40 in a defined position. However, each recess 51 is preferably slightly elongated in the radial direction, by several thousandths of an inch, to permit limited movement of its associated pin in the radial direction. In addition, each end plate 34, 36 is provided with an annular recess 52 that receives a respective one of spring units 42.

Each spring unit 42 is a one-piece element that includes a circular outer support ring 42a which carries an axially projecting rim 42b, several radially inwardly projecting spokes, an inner ring composed of a plurality of radially deformable spring elements 42c and a plurality of radially outwardly projecting tabs 42d. Each spring unit 42 is seated in the recess 52 of a respective end plate 34, 36, with rim 42b being located in a circular groove 53a and tabs 42d being located in slots 53b of the associated end plate. The engagement of tabs 42d in slots 53b prevents rotation of each unit 42 relative to its respective end plate and engages one end of each pin 40 to bias pins 40 radially outwardly against camming surfaces 50 and away from armature shaft 14.

Each end of each pin 40 is inserted between ring 42*a* and a respective spring element 42*c* of a respective spring unit 42 so that the respective spring element 42*c* resiliently biases its associated pin 40 away from armature shaft 14.

Figure 6:
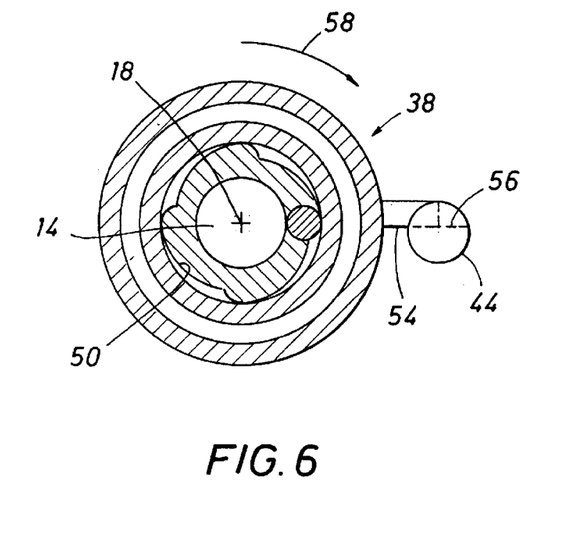

The illustrated embodiment is provided with four pins 40, only one of which is shown in FIG. 6.

Figure 7:
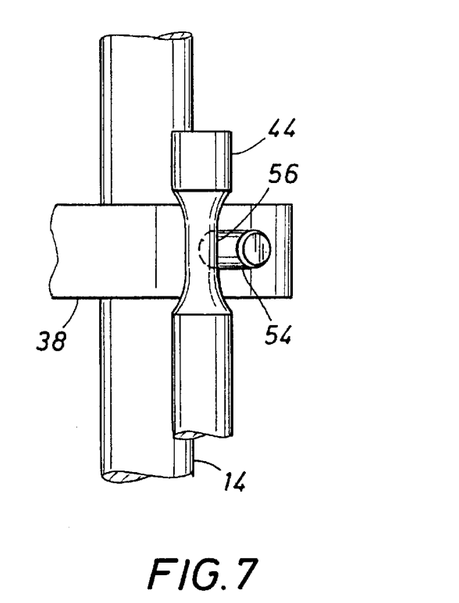
FIG. 7 is a side view of another component of the device of FIGS. 2 and 3.

Rotary bearing 38 carries a rotation pin 54 that engages in a camming slot 56 provided in input member 44. As shown in FIG. 7, slot 56 has a linear central portion and is curved at its ends. When valve head 24 approaches either one of its end positions, a respective curved end of camming slot 56 engages rotation pin 54, causing rotary bearing 38 to pivot through a small angle, generally in the range of 5° to 10°, in the direction of arrow 58 in FIG. 6 about central axis 18.

As rotary bearing 38 pivots, camming surfaces 50 move relative to pins 40 in the clockwise direction with respect to the view of FIG. 6, pressing pins 40 against armature shaft 14. This clamps armature shaft 14 in place, preventing movement of armature shaft 14 along central axis 18 and therefore holding valve head 24 in either its open or closed position.

According to an exemplary preferred embodiment of the invention, pins 40 are dimensioned so that when rotary bearing 38 is in its rest position, shown in FIG. 6, so that armature shaft 14 is free to move parallel to axis 18, there will be a clearance of about 0.001" to 0.01" between pins 40 and armature shaft 14. Presently, the preferred clearance is of the order of 0.003" and it is preferred that camming surfaces 50 be given a slope that will cause pins 40 to come into contact with armature shaft 14 after a rotation of rotary bearing 38 through an angle of 5° to 10°, corresponding to a circumferential displacement of camming surfaces by a distance of approximately 0.02" to 0.03".

If armature shaft 14 has a diameter of 0.30", which is a typical dimension for automobile engine valve stems, rotary bearing 38 may have an outer diameter of the order of 0.93"and a thickness of the order of 0.30", each of end plates 36 and 38 may have an outer diameter of the order of 1.5", and the assembly of end plates 34 and 36 and rotary bearing 38 may have a thickness of 0.45".

Figure 8A:
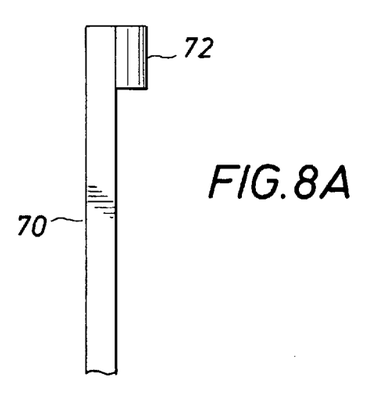
FIG. 8A is a side elevational detail view of a modified form of construction of one of the components of the embodiment of FIGS. 1–7.
Figure 8B:
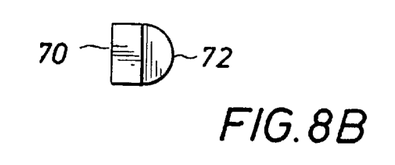
FIG. 8B is a top plan view of the component shown in FIG. 8A.

During prolonged use of a valve actuator equipped with the above-described clamping device, the engaging surfaces of rotation pin 54 and camming slot 56 will be subjected to wear, resulting in a progressive reduction in the clamping force created between pins 40 and armature shaft 14. In addition, temperature variations experienced by the clamping device will adversely effect the clamping action. In order to minimize these effects, rotation pin 54 can be replaced by a flexible beam member, as shown in FIGS. 8A and 8B. This member includes a flexible beam 70 having a camming element 72 at its outer extremity. Beam 70 and camming element 72 are dimensioned so that when the clamping device is initially placed into use, beam 70 will be resiliently flexed by a small amount whenever rotary bearing 38 has been rotated to its clamping position. As the engaging surfaces of camming slot 56 and camming element 72 experience wear, the degree of flexing will diminish, but rotary bearing 38 will continue to be rotated sufficiently to securely clamp pins 40 against armature shaft 14. This flexing of beam 70 will also help to prevent changes in the extent of pivoting movement of rotary bearing 38 as a result of temperature variations.

In existing electromagnetic valve actuator assemblies, the combined force level produced by springs 26 and 28 when armature 20 is in one of its end positions is in the range of about 170 to 200 lbs. The rotary clamping element of the above-described embodiment has the capability of applying a clamping force sufficient to oppose this spring force when both electromagnets are de-energized. However, tests have shown that a lower clamping force level of the order of about 70 lbs would be desirable and this clamping force level will allow the holding current to the energized electromagnet to be reduced by a satisfactory amount from the level required to displace armature 20 to the selected end position. In this case, if the current to the energized electromagnet is completely cut off, the net force produced by springs 26 and 28 will begin to move armature 20 away from its end position.

Figure 9:
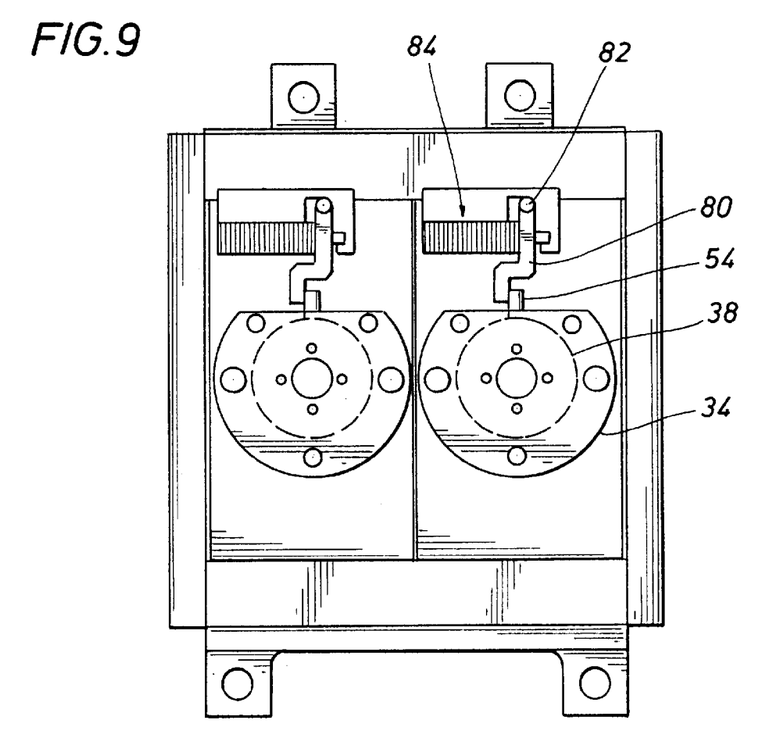
FIG. 9 is a top plan view of a second embodiment of a device according to the invention, with a top portion of the actuator housing removed.
Figure 10:
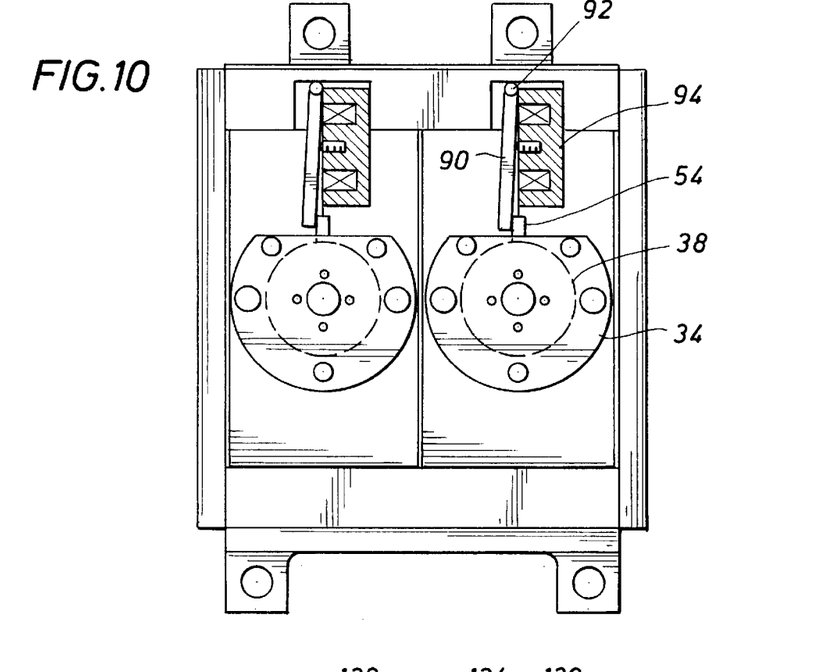
FIG. 10 is a view similar to that of FIG. 9 showing another embodiment of a device according to the invention.

According to further embodiments of the invention, the mechanical actuation of the clamping devices can be replaced by various types of electrical actuation, including actuation by a piezoelectric element as shown in FIG. 9 and actuation by an auxiliary electromagnet, as shown in FIG. 10.

Each of FIGS. 9 and 10 shows two actuators disposed side-by-side for operating two valve heads associated with one engine cylinder.

Referring to FIG. 9, rotation pin 54 of each clamping device is engaged by one end of a lever 80 that is mounted to pivot about a horizontal axis 82. Lever 80 is engaged, at a point between its ends, by a piezoelectric driver 84 that is connected to receive a suitable drive voltage (connection not shown). When such a voltage is applied to driver 84, it expands horizontally against lever 80 in order to pivot rotary bearing 38 into a clamping position.

In the embodiment shown in FIG. 10, rotation pin 54 of each clamping device is engaged by one end of a lever 90 whose other end is pivoted to rotate about a horizontal axis 92. Lever 90 is associated with an auxiliary electromagnet 94 which, when energized by a suitable drive current (connection not shown) attracts lever 90 in a manner to displace rotation pin 54 and thus rotate rotary bearing 38 into its clamping position.

In the embodiments illustrated in FIGS. 1–8, neither electromagnet 12 or 13 need be provided with energizing current during the periods when valve head 24 is being held in either one of its end positions. Alternatively, a reduced level of energizing current may be supplied to that one of electromagnets 12 and 13 which last moved valve head 24 to its present end position.

In the case of the embodiments illustrated in FIGS. 9 and 10, both electromagnets 12 and 13 may be de-energized and the energy consumed by piezoelectric driver 84 or electromagnet 94 to effect clamping of armature shaft will be substantially lower than the electrical energy that would be consumed by one of electromagnets 12 and 13 to hold valve head 24 in its end position if the actuator were not provided with a clamping device according to the invention.

Figure 11:
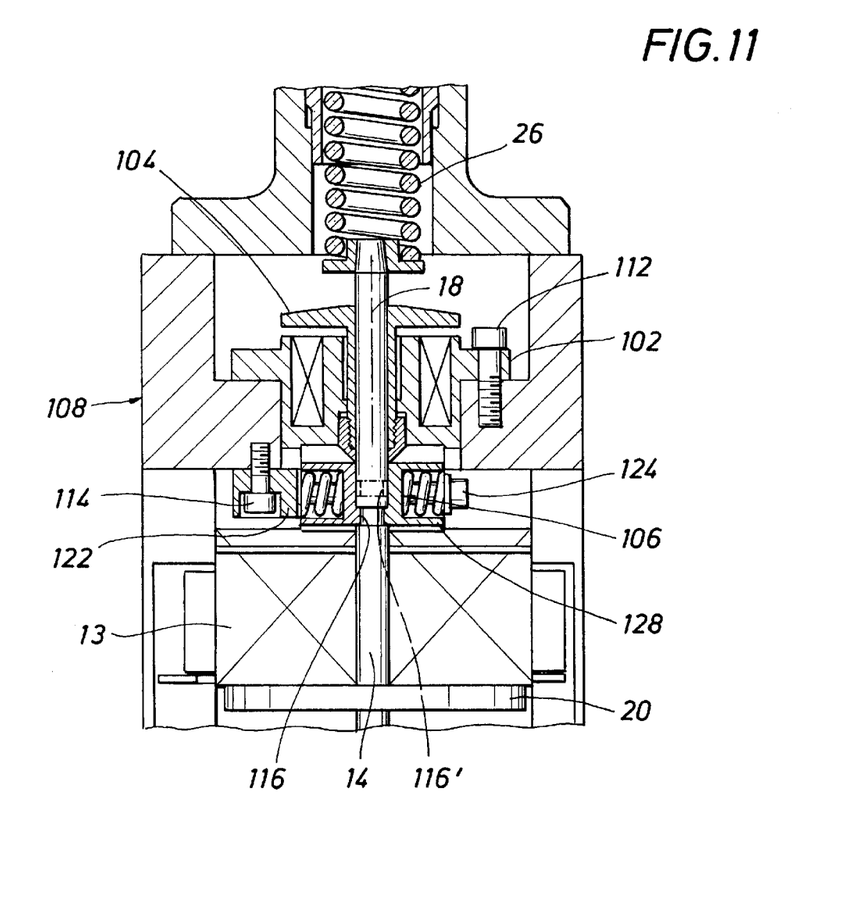
FIG. 11 is a view similar to that of FIG. 1 showing an embodiment of a latching device according to the invention.

FIG. 11 is a cross-sectional view showing a portion of an electromagnetic valve actuator equipped with a further embodiment of a clamping or latching assembly according to the invention. The assembly according to this embodiment includes a support member 102 containing a clamping electromagnetic, a clamping armature 104 and a clamping or latch mechanism 106.

Support member 102 is fixed to a spacer block 108 forming a component of the electromagnetic valve actuator housing. Support member 102 has a central bore through which both armature 104 and armature shaft 14 extend. Armature 104 is free to move, parallel to central axis 18, relative to both support member 102 and shaft 14.

Mechanism 106 is constructed and mounted to be urged against shaft 14 under the influence of biasing springs, as will be described in greater detail below.

Support member 102 is secured to spacer block 108 by means of threaded bolts or machine screws, one of which is shown at 112. Similarly, mechanism 106 is secured to block 108 by at least one machine screw 114.

Mechanism 106 may be provided with frictional breaking and/or clamping surfaces, or may, as illustrated in FIG. 11, have inwardly projecting latching elements that will engage in an annular recess 116 in the outer surface of shaft 14. In embodiments which employ latching, the clamping assembly establishes a well defined end position for shaft 14.

In the illustrated embodiment, recess 116 is located to cause mechanism 106 to latch shaft 14 in its upper end position, in which the associated valve is in its closed state. However, in further accordance with the invention, shaft 14 could be provided with a further recess 116', shown in broken lines, which would be engaged by the latch elements of mechanism 106 when shaft 14 is in its lower end position, corresponding to the full, open position of the valve.

Mechanism 106 is moved to an unclamping, or unlatching, position in response to downward movement of armature 104, which occurs when the clamping electromagnet carried by support member 102 is energized. At this time, armature 104 is attracted to the clamping electromagnet, causing camming surfaces at the lower end of armature 104 to engage inwardly facing surfaces of mechanism 106. Further downward movement of armature 104 effects radial separation of the elements of mechanism 106 by an amount sufficient to allow free movement of shaft 14 along central axis 18.

Figure 12:
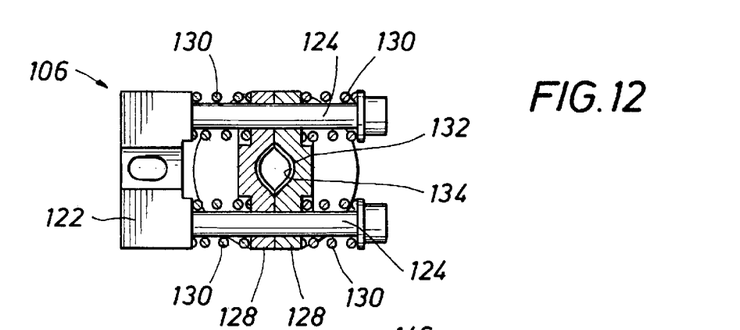
FIG. 12 is a detail view, partially in cross section, of a component of the device of FIG. 11.

One embodiment of mechanism 106 is shown in greater detail in FIG. 12, which is a top plan view. Mechanism 106 includes an end support 122 via which mechanism 106 is secured to block 108, as already described.

Mechanism 106 further includes two machine screws 124 each engaging in a threaded bore (not shown) in end support 122 and extending through passages in two half sliders 128. Each screw 124 further extends through two cylindrical compression springs 130 which constitute the biasing springs that urge half sliders 128 together.

Each half slider 128 is provided with a recess 132. The two recesses 132 of the two half sliders 128 cooperate to define a passage for shaft 14. Recesses 132 may also define braking or clamping surfaces for shaft 14, in which case half sliders 128 may be made of a type of material utilized for brake pads.

Alternatively, each recess 132 may be provided, as shown, with a projection defining a latch element 134 that will engage in recess 116, and recess 116' if provided, when shaft 14 is in one or two defined positions.

Figure 13:
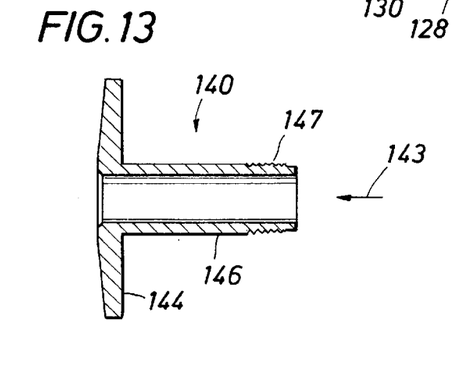
FIG. 13 is a longitudinal, cross-sectional view of a further component of the device in FIG. 11.
Figure 14:
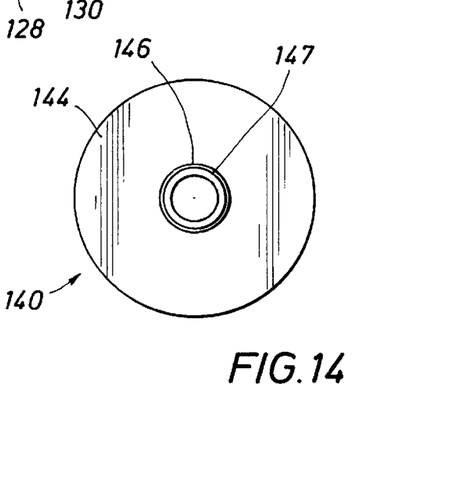
FIG. 14 is an end view of the component of FIG. 13.

An embodiment of armature 104 is illustrated in FIGS. 13, 14, 15 and 16. Armature 104 is composed of an armature body 140 and an armature cap 142. Armature body 140 is shown in FIGS. 13 and 14, FIG. 13 being a cross-sectional view and FIG. 14 being an end view in the direction of arrow 143 in FIG. 13. Armature body 140 has a disc portion 144 which is acted on by the clamping electromagnet in support member 102 and a tubular portion 146 having a through bore. Tubular portion 146 is dimensioned to receive shaft 14, as shown in FIG. 11, and to slide with respect to support member 102. In addition, tubular portion 146 is provided with a male screw thread 147 at the end remote from disc portion 144.

Figures 15, 16:
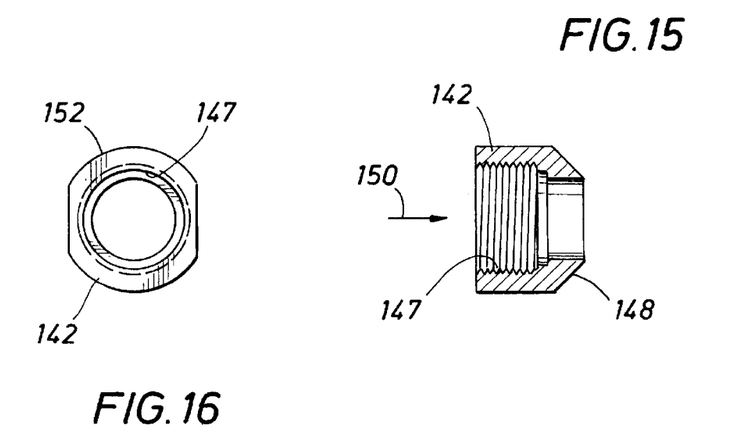
FIG. 15 is a longitudinal, cross-sectional view of another component of the device of FIG. 11.
FIG. 16 is an end view of the component of FIG. 15.

Referring to FIGS. 15 and 16, armature cap 142 is constructed and dimensioned to be screwed onto the end of tubular portion 146 that is remote from disc portion 144, armature cap 142 being provided with a female screw thread 147' that mates with screw thread 147 on tubular portion 146. When armature cap 142 is assembled to armature body 140, a frustoconical surface 148 on armature cap 142 will be directed away from disc portion 144 and will provide the camming surface which acts on half-sliders 128.

Referring to FIG. 16, which is an end view in the direction of arrow 150 of FIG. 16, the outer periphery 152 of armature cap 142 is provided with two flat surfaces for engagement of armature cap 142 by a wrench.

Figure 17:
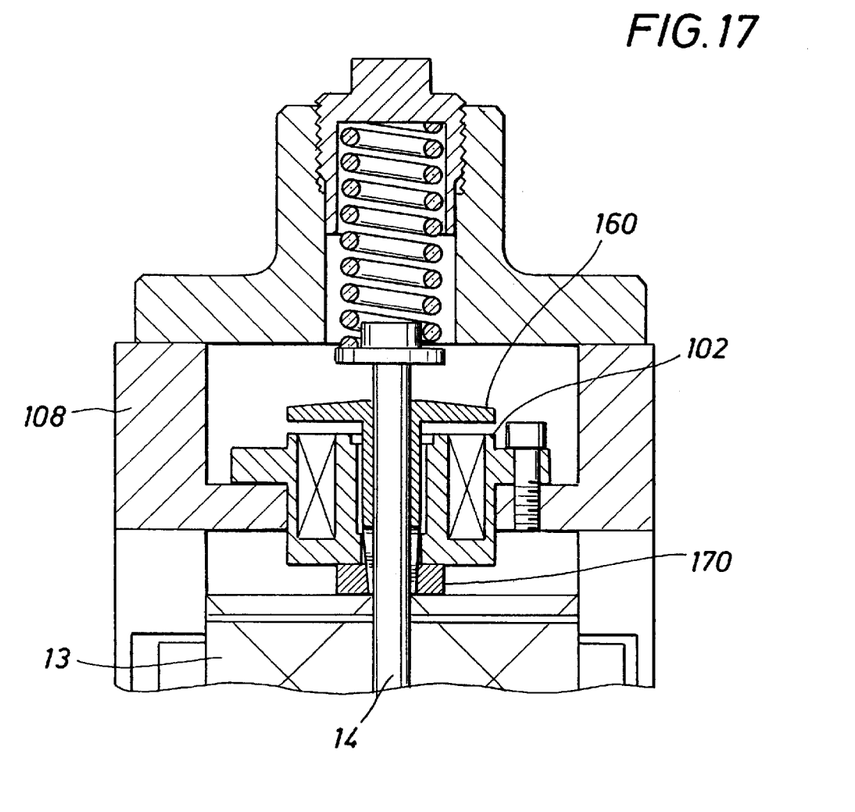
FIG. 17 is a view similar to that of FIG. 1 showing another embodiment of a clamping device according to the invention.
Figure 18:
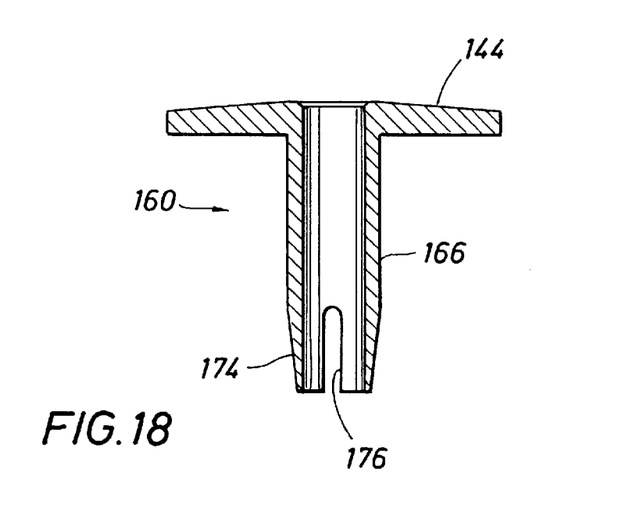
FIG. 18 is a longitudinal, cross-sectional view of one component of the device of FIG. 17.

FIGS. 17 and 18 are elevational, cross-sectional views of, respectively, a further embodiment of a clamping assembly according to the invention and one component of that assembly. This embodiment is structurally similar to the embodiment of FIGS. 11–16 in that the assembly includes the same support member 102 and spacer block 108. In addition, this embodiment further includes an armature 160 which has the same general form as armature 104, but differs with respect to the configuration of the lower end of its tubular portion 166, this end being remote from disc portion 144. In addition, the assembly of FIGS. 17 and 18 does not have a clamping or latch mechanism of the type employed in the embodiment of FIGS. 11–16, but is provided, at the same location, with a washer 170 having an inner wall which tapers downwardly, toward electromagnet 13.

As shown most clearly in FIG. 18, the lower end of tubular portion 166 has an outer wall 174 that tapers downwardly and the lower end of tubular portion 166 is provided with two or more slots 176 which are preferably coextensive with tapered outer wall 174, in the longitudinal direction of armature 160. Tapered outer wall 174 is dimensioned to mate with the tapered inner surface of washer 170 so that when armature 160 is pulled downwardly upon actuation of the electromagnet in support member 102, a camming action will occur between washer 170, which is held securely between support member 102 and electromagnet 13, causing the lower end of tubular portion 166 to be pressed against armature shaft 14 and to perform a braking and clamping operation.

In the embodiments of FIGS. 11–18, the clamping assemblies are dimensioned to assure that a gap will remain between disc portion 144 and the upper surface of support member 102 and its associated clamping electromagnet when that electromagnet has been energized. This will help to reduce both wear on the armature and armature-to-electromagnet contact noise.

Figures 19, 20:
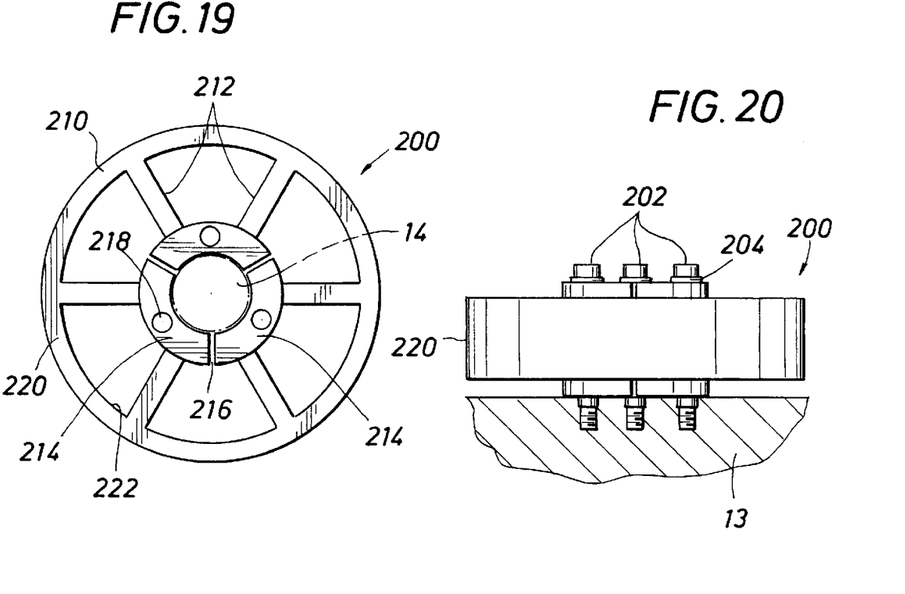
FIG. 19 is a plan view of a primary component of a further embodiment of a clamping device according to the invention.
FIG. 20 is a side elevational view of the device which incorporates the component of FIG. 19.

Another embodiment of a clamping mechanism according to the invention is illustrated in FIGS. 19 and 20 which are, respectively, a plan view and a side elevational view.

This embodiment includes a circular component 200 made of piezoelectric material, component 200 being secured to upper electromagnet 13 by means of three bolts 202 and three spring washers 204. Neither washers 204 nor bolts 202 are shown in FIG. 19.

Component 200 includes a rigid outer ring 210, an array of radially extending spokes 212 distributed at uniform intervals about the circumference of ring 210 and an inner ring composed of a plurality of arcuate parts 214. Parts 214 are spaced apart around the periphery of the inner ring and are separated from one another by radial slots 216. In addition, parts 214 are provided with bores 218 for the passage of bolts 202Bores 218 are made slightly larger in diameter than the shanks of bolts 204 in order to permit radial movement of parts 214.

The outer surface 220 of ring 210 is an anode surface and the inner surface of ring 210 is a cathode surface, each of these surfaces being coated with a nickel or silver layer, or substrate, via which an excitation voltage can be applied to component 200, and more specifically to ring 210.

The operating mechanism of this embodiment is based on the principle of piezoelectric ring expansion/contraction in the "transverse ring mode" direction. A voltage applied between the conductive coatings on surfaces 220 and 222 will, depending on the polarity of the voltage, cause radial expansion or contraction of ring 210. When the polarity of the voltage causes expansion, ring 210 will expand radially such that inner and outer surfaces 220 and 222 both move radially away from one another. This, inner surface 222 moves radially inwardly, or contracts. This produces inward radial movement of spokes 212 and inner ring parts 214 inwardly to clamp the armature shaft. If desired, a coating or layer of a material having good braking characteristics can be deposited in the inner surfaces of inner ring parts 214. Since the operation of this component is based on expansion and contraction of outer ring 210, spokes 212 and inner ring parts 214 need not be made of piezoelectric material. However, manufacture is simplified if component 200 is a one-piece, homogeneous body, which requires that the entire component be made of piezoelectric material.

As shown in FIG. 20, component 200 is shaped so that inner ring parts 214 are longer, in the axial direction, than outer ring 210 or spokes 212. The greater length of inner ring parts 214 provides improved support against the electromagnet or cylinder head for the fairly fragile piezoelectric material.

Isolation pads and/or an elastomer coating surrounding the mechanism (not shown) can be added to provide damping effects that will reduce impact forces and mechanical noise, prevent moisture and oil contamination, and provide electrical isolation for the system.

Because thermal growth will occur, the required tolerances are tight. The thermal expansion coefficients of the piezoelectric, brake and armature shaft materials must be closely coordinated. The required rapid response time, of the order of 10 microseconds, of the piezoelectric material will make possible the creation of multiple braking profiles, for example by pulsing the amplitude of the voltage applied to the piezoelectric material. A braking profile is a particular excitation voltage time variation pattern that will determine the timing and braking rate of a particular braking operation. Excitation voltage levels for the form of construction disclosed herein will range between 200 and 2500 volts depending on the amount of expansion or contraction required. The accompanying current level will be minimal, typically between 1 and 5 mA. A microprocessor control system can be programmed to adjust the excitation voltage as a function of temperature and the expansion coefficients of the component materials.

Figures 20A, 21:
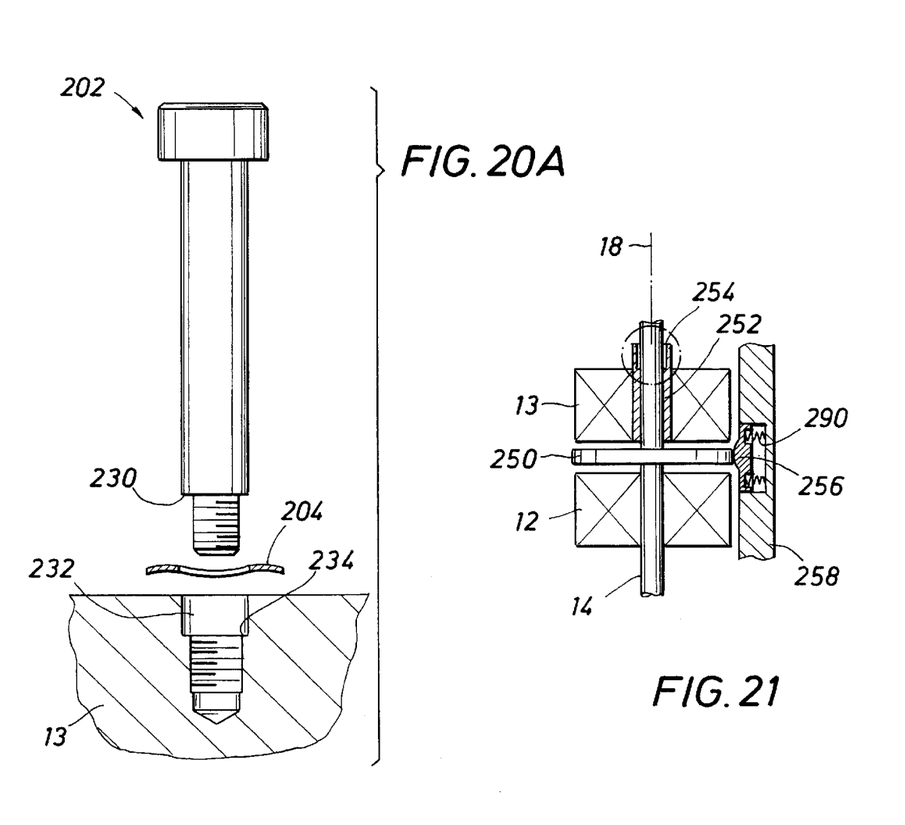
FIG. 21 is a longitudinal, cross-sectional view of a further embodiment of a clamping device according to the invention.

In order to assure that inner ring parts 214 can experience the required radial movements in response to radial expansions and contractions of outer ring 210, parts 214 must be secured to electromagnet 13 by a suitable holding, or clamping, force. This is achieved, in the case of the disclosed embodiment, by the use of securing element units that apply accurately defined clamping forces to inner ring parts 214. One such securing element unit is shown in FIG. 20A. The component shown in FIGS. 19 and 20 will be provided with three of these units.

The unit shown in FIG. 20A includes bolt 202 in the form of a shoulder bolt, associated with spring washer 204. Bolt 202 has a shank that is provided at its lower end with a radially extending abutment surface 230. Electromagnet 13 is provided with a blind bore having a threaded portion for receiving a mating threaded portion of bolt 202, the blind bore additionally having a recess 232 for receiving a lower portion of the shank of bolt 202. Recess 232 has a base 234 on which abutment surface 230 will rest when bolt 202 is fully installed. The length of the shank of bolt 202 and the depth of recess 232 are selected to assure that when abutment surface 230 rests on base 234, washer 204 will be pressed against the upper surface of an associated inner ring part 214 with a clamping force that will hold component 200 securely in place and allow the necessary radial movements of inner ring parts 214.

The clamping device shown in FIGS. 19 and 20 could be employed in the actuator shown in FIG. 1 in place of clamping device 30 an its associated components.

Further embodiments of mechanical clamping devices according to the invention can be constructed to achieve a clamping action in response to a small angular rotation of the armature shaft when the valve reaches either one of its end positions. One embodiment of a device of this type is illustrated in FIGS. 21–30.

FIG. 21 is a cross-sectional view showing electromagnets 12 and 13 and a portion of armature shaft 14 associated with one valve actuator. In this embodiment, armature shaft 14 forms a unit with an armature 250 that is movable, as in the previously described embodiments, with armature shaft 14, along central axis 18 in a space between electromagnets 12 and 13.

In this embodiment, electromagnet 13 is provided with an enlarged central bore and a support tube 252 is fixed in that central bore. The inner surface of tube 252 is dimensioned to permit shaft 14 to slide easily therein and will be provided, if necessary, with guide bushings, as would the smaller diameter bore in electromagnet 12, in accordance with the usual practice in the art.

The upper end of tube 252 is provided with a blind bore 254 to receive components of a clamping device according to this embodiment of the invention. This clamping device additionally includes two linear cams, one of which, 256, is visible in FIG. 21 and the other of which, 257, is shown in FIGS. 26 and 27–29. Each of these cams, including cam 256, is held in position between electromagnets 12 and 13 by a side plate 258 that will be secured to the actuator housing, as by machine screws 259, depicted in FIG. 26. Each cam 256, 257 is held in a respective recess in plate 258, these recesses being to prevent movement of cams 256, 257 parallel to central axis 18 and perpendicular to the plane of FIG. 21.

As will be explained in greater detail below, when armature 250 is displaced toward either one of its end positions, armature 250 is pivoted, along with shaft 14, through a small angle about axis 18 by the action of linear cams 256 and 257 (FIGS. 26–30) and the rotation of shaft 14 causes cylindrical pins 276 (FIGS. 24 and 25) housed in bore 254 to be clamped against shaft 14. The resulting level of clamping force causes shaft 14 and armature 250 to be retained in the end position while a reduced level of current is being applied to that one of electromagnets 12 and 13 that was energized to move armature 250 to its current end position. Suitable relations among mechanical clamping force, biasing spring force and electromagnet hold current are described earlier herein in connection with the embodiment shown in FIGS. 1–8 and that discussion is equally applicable to the embodiment presently being described. Subsequent movement of armature 250 to its opposite end position is effected by energizing the appropriate electromagnet 12 or 13 to produce a magnetic attracting force sufficient to overcome the mechanical clamping force.

Figure 22:
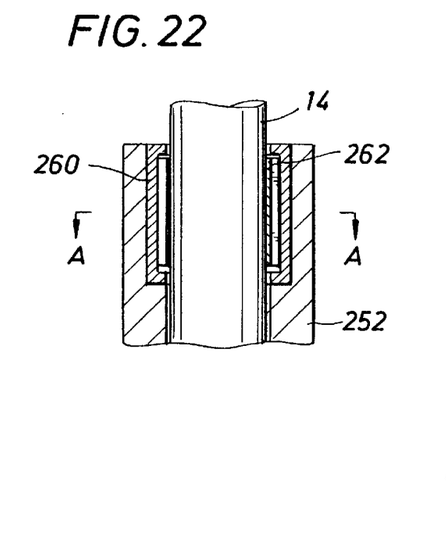
FIG. 22 is a longitudinal, cross-sectional detail view of a portion of the device of FIG. 21.

FIG. 22 is a detail view of the portion of the structure of FIG. 21 that is enclosed by a circle. This view shows the upper end of tube 252 and illustrates two of the components of the clamping device which are installed in blind bore 254. These components include a cylindrical race 260 and a pin retainer 262. Race 260 is fixed, as by a force fit or cementing, in blind bore 254 and pin retainer 262 is held in place in race 260 by means of inwardly directed flanges at both ends of race 260. Retainer 262 holds a series of clamping pins 276, which are not illustrated in FIG. 22.

Figure 23:
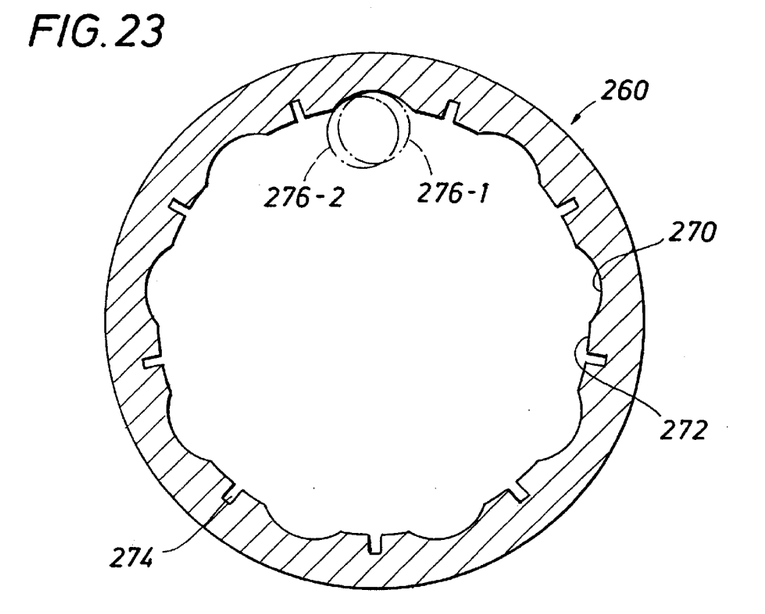
FIGS. 23 and 24 are axial end views of two components of the device of FIG. 21.

FIG. 23 is a cross-sectional detail view in the direction of plane A—A of FIG. 22, showing one form of construction of race 260. This race has a profiled inner surface composed of a series of recesses 270 separated by lands 272. The inner surface of race 260 also has a series of grooves 274 that will be engaged by pin retainer 262 to prevent it from rotating relative to race 260.

Also shown in FIG. 23 in broken lines are two positions for one of pins 276. In position 276-1, pin 276 is fully seated in an associated recess 270 and contacts shaft 14 with a light bearing force that allows axial movement of shaft 14. In position 276-2, pin 276 has been moved circumferentially and radially inwardly by a small amount to apply a clamping force to shaft 14. As will be explained in greater detail below, this movement of pin 276 is produced by a small angular rotation of shaft 14. Because shaft 14 is always in contact with pins 276, rotation of shaft 14 causes pins 276 to roll against shaft 14 and the inner surface of race 260, resulting in the movement between positions 276-1 and 276-2. In the embodiment illustrated, nine such pins are provided, each pin being associated with a respective recess 270.

Figure 24:
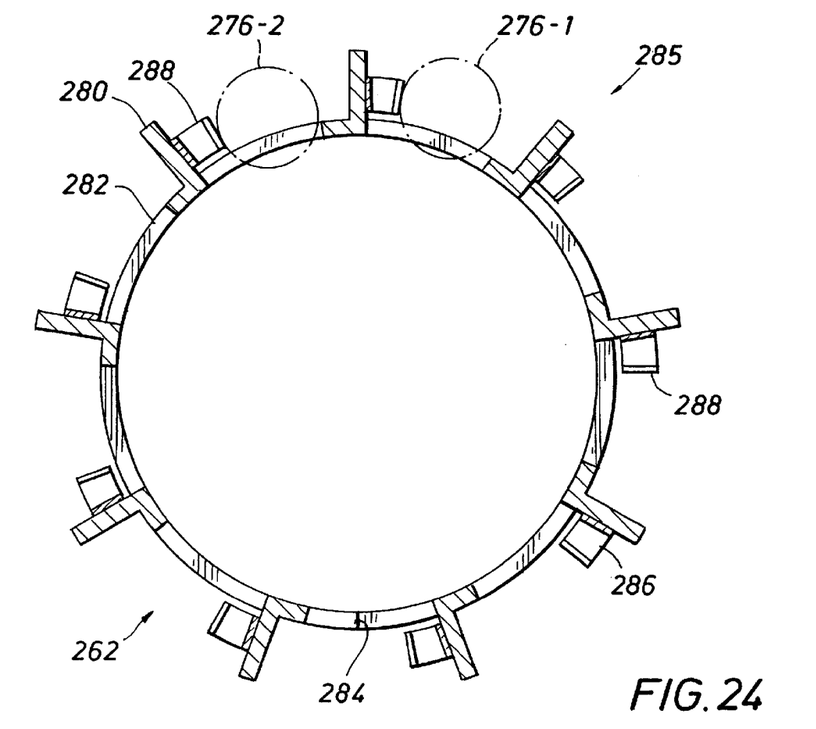

FIG. 24 is a cross-sectional view of pin retainer 262, also taken in plane A—A of FIG. 22, but drawn to a slightly larger scale than is FIG. 23.

Pin retainer 262 may be formed from an initially flat strip of high strength steel or high temperature plastic having portions which are cut and bent to form outwardly projecting tabs 280. These tabs are cut out in such a way that a continuous portion 282 of the sheet remains along each edge thereof. This sheet is then bent into a circular shape, which is the shape shown in FIG. 24, with the two ends of the sheet meeting at an abutment plane 284. When retainer 262 is installed in race 260, tabs 280 will engage in grooves 274 in race 260.

Retainer 262 is further provided with a plurality of curved leaf type compression springs 286, each spring 286 being fastened at its midpoint to a respective tab 280, as by spot welding or staking, so that both ends 288 of each spring 286 project circumferentially away from its associated tab 280.

FIG. 24 further shows two pins 276 each in one of the positions 276-1 and 276-2, which are the same positions as those identified by corresponding numerals in FIG. 23. Each pin 276 is urged toward the position 276-1 by the action of its associated spring 286. When in position 276-1, each pin 276 is seated in an associated recess 270 and contacts shaft 14 with a low contact force. Upon rotation of shaft 14, in the counterclockwise direction with respect to the plane of FIG. 24, pins 276 will roll in contact with shaft 14 so as to be urged against their respective leaf springs 286 and to move out of the associated recess 270. This causes each pin to move into the position 276-2 and to apply a clamping force to shaft 214. FIG. 24 additionally shows, in broken lines, at pin position 276-2, deflection of the ends 288 of the associated spring 286.

When shaft 14 rotates back in the clockwise direction to its original position, pins 14 again rotate with shaft 14 back into recesses 270.

Figure 25:
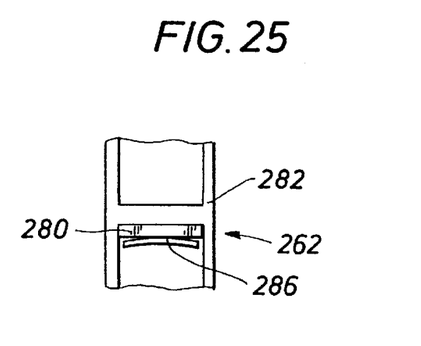
FIG. 25 is a detail view, in the direction of arrow 285 of FIG. 24.

FIG. 25 is a detail view in a plane parallel to central axis 18 showing a portion of retainer 262.

Figure 26:
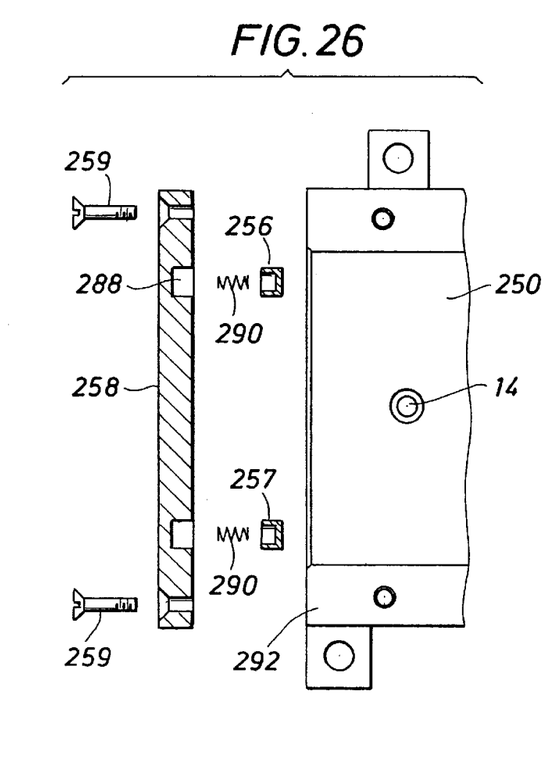
FIG. 26 is a plan view of further components of the device shown in FIG. 21.

FIG. 26 is a top view taken in a plane perpendicular to central axis 18, illustrating the portion of the clamping device that is associated with armature 250. It will be noted that, in this embodiment, armature 250 has a rectangular outline but it will be understood, from the following description, that armature 250 can have other forms that will enable it to interact in the required manner with cams 256 and 257. Side piece 258, screws 259 and cams 256 and 257 are shown in exploded form in order to more clearly illustrate the form of the individual components. Each recess in side piece 258 houses two compression springs 290 that extend into blind bores formed in the rear side of each of cams 256 and 257. Springs 290 maintain a spacing between cams 256 and 257 and the bottoms of the recesses in side piece 258 so that cams 256 and 257 have some freedom of movement toward and away from the bottoms of the recesses. In the assembled device, side piece 258 will be fastened to actuator housing 292 in order to hold cams 256 and 257 in place, while permitting those cams to undergo some movement perpendicular to the central axis 18.

Figure 27:
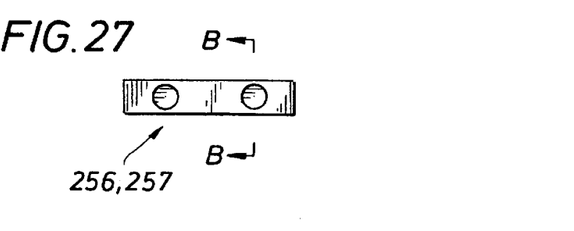
FIG. 27 is a rear detail view of one of the components of the device shown in FIG. 21.
Figure 28:
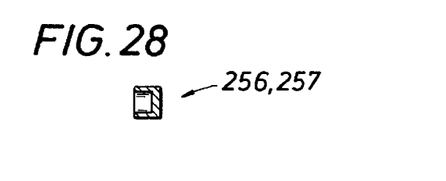
FIG. 28 is a cross-sectional view taken along the line B-B' of FIG. 27.

A rear view of cams 256 and 257 is shown in FIG. 27, from which the form of the blind bores in the cams can be seen. FIG. 28 is a cross-sectional view along the plane B—B of FIG. 27 and also illustrates one of the blind bores.

Figure 29:
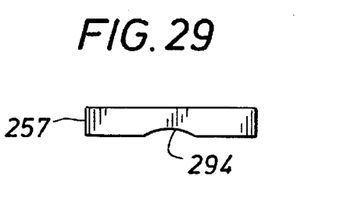
FIGS. 29 and 30 are side elevational views of two of the components of the device shown in FIG. 21, which components are also shown in FIGS. 27 and 28.
Figure 30:
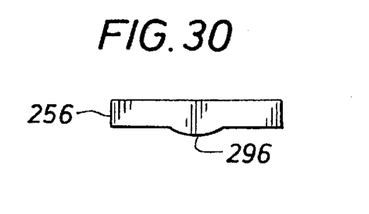

FIGS. 29 and 30 are side elevational views illustrating the camming surfaces of cams 257 and 256, respectively. As shown in FIG. 29, the camming surface of cam 257 that faces armature 250 has, at a midpoint of its length, a recess 294, while the camming surface of cam 256 has, at a corresponding point, a projection 296.

Referring again to FIGS. 21 and 26, as armature 20 is displaced parallel to central axis 18 from one of its end positions, one end of a side edge of armature 250 will be acted on by cam 256, while the other end of that side edge will be acted on by cam 257. Movement of armature 250 over projection 296 will tend to increase the force applied by armature 250 to cam 256, thus increasing the opposing force produced by the springs 290 associated with cam 256, and simultaneously movement of armature 250 over recess 294 will tend to reduce the force applied by armature 250 to cam 257, thus tending to reduce the force produced by the springs 290 associated with cam 257. Therefore, armature 250 will be pivoted clockwise, with respect to the viewing direction of FIGS. 23, 24 and 26, about central axis 18 by an amount determined by the spring rates of all springs 290, which spring rates are preferably identical for all springs 219. Pivotal movement of armature 250 in this sense tends to release the clamping forces applied by pins 276 to armature shaft 14.

As armature 250 moves parallel to central axis 18 in either direction away from recess 294 and projection 296, the opposing forces produced by the springs 290 associated with cam 256 will decrease and the opposing forces produced by the springs 290 associated with cam 257 will increase, causing armature 250 to undergo a small degree of counterclockwise pivotal movement about central axis 18. Because shaft 14 is in contact with pins 276, this pivotal movement will act to displace pins 276 from the position 276-1 to the position 276-2 shown in FIGS. 23 and 24, creating a clamping action between pins 276 and shaft 14.

Thus, the angular position of armature 250 when in contact with recess 294 and projection 296 is set to correspond to position 276-1 of pins 276, while the angular position assumed by armature 250 when not in contact with recess 294 and projection 296 corresponds to the position 276-2 of pins 276.

It will be seen that in the embodiment illustrated in FIGS. 21–30, armature shaft 14 will be automatically held in either end position with a force sufficient to allow the holding current applied to either one of electromagnets 12 and 13 to be reduces and will remain in that position until the electromagnet which is then holding armature 250 is de-energized.

In a preferred form of construction of the embodiment of FIGS. 21–30, race 260, pins 276 and shaft 14 will all be made of materials having essentially the same coefficient of thermal expansion. This embodiment will be installed in an actuator having the form shown in FIG. 1, in place of clamping mechanism 30 and its associated components.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electromagnetic actuator comprising:

a cylinder head having a valve seat;

a valve having a valve stem and a valve head, the valve being mounted for movement between a first position wherein the valve seat is closed by the valve head, and a second position wherein the valve seat is open;

an armature secured to the valve stem;

an electromagnet which can be energized and de-energized to move the armature so that the armature moves the valve seat between the first and second positions;

a mechanical holder that can hold the valve in a selected one of the first and second positions; and a link mechanism disposed between the mechanical holder and the armature, the link mechanism coupled to the armature to move as a unit with the armature, the link mechanism causing (i) engagement of the mechanical holder upon movement of the valve into the selected position so that the holder holds the valve in the selected position (ii) and disengagement of the holder to release the valve when the electromagnet is operated to move the valve out of the selected position.

2. The actuator according to claim 1 further comprising a shaft fixed to said armature, the shaft having an axis that extends along a linear path, the mechanical holder operable to apply a clamping force to said shaft in a direction perpendicular to the linear path.

3. The actuator according to claim 2 wherein said mechanical holder includes at least one movable clamping element and an actuating mechanism engaging said at least one movable clamping element and operative for pressing said at least one movable clamping element against said armature shaft.

4. The actuator according to claim 3 wherein said link mechanism further comprises an input member connected to move as a unit with said armature and said actuating mechanism comprises a motion converting member connected between said input member and said at least one movable clamping element for moving said at least one movable clamping element into contact with said armature in response to movement of said input member with said armature.

5. The actuator according to claim 4 wherein said motion converting member is rotatable about said shaft axis and has at least one camming surface which acts on said at least one clamping element to press said at least one clamping element against said armature shaft during rotation of said motion converting element.

6. The actuator according to claim 5 wherein said input member displaces said motion converting member in a direction transverse to the movement of the valve.

7. The actuator according to claim 5 wherein said at least one clamping element comprises a plurality of pins spaced apart circumferentially around said armature shaft and said at least one camming surface comprises a plurality of camming surfaces each acting on a respective one of said pins.

8. The actuator according to claim 4 wherein said motion converting member comprises a resilient arm which cooperates with said input member.

9. The actuator according to claim 2 wherein the mechanical holder comprises a plurality of holding elements mounted for movement perpendicular to the linear path, and a camming member which is movable parallel to the linear path for displacing said holding elements.

10. The actuator according to claim 2 wherein the mechanical holder comprises a rotatable bearing and said link mechanism comprises a first cam surface operatively associated with said link mechanism for rotating the rotatable bearing about the axis in response to movement of said armature to either one of said end positions, and said mechanical holder further comprises a clamp applying a clamping force to said shaft in response to rotation of said rotatable bearing about the axis.

11. The actuator according to claim 10 wherein said clamp comprises a plurality of circularly cylindrical pins surrounding said shaft, said pins contacting said shaft with a contact force sufficient to cause said pins to roll in contact with said shaft when said rotatable bearing rotates about the axis; and a second cam surface operatively associated with said pins for pressing said pins against said shaft when said shaft rotates in a given sense and said pins roll in contact with said shaft.

* * * * *